United States Patent
Glugla

(10) Patent No.: US 11,873,774 B2
(45) Date of Patent: Jan. 16, 2024

(54) METHOD AND SYSTEM FOR REACTIVATING A CATALYST

(71) Applicant: Ford Global Technologies, LLC, Dearborn, MI (US)

(72) Inventor: Chris Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/452,526

(22) Filed: Oct. 27, 2021

(65) Prior Publication Data

US 2023/0127422 A1  Apr. 27, 2023

(51) Int. Cl.
| | | |
|---|---|---|
| F02D 41/12 | (2006.01) | |
| F02D 41/14 | (2006.01) | |
| B01J 38/58 | (2006.01) | |
| F02D 41/02 | (2006.01) | |
| F02D 41/00 | (2006.01) | |

(52) U.S. Cl.
CPC ............ *F02D 41/126* (2013.01); *B01J 38/58* (2013.01); *F02D 41/0087* (2013.01); *F02D 41/024* (2013.01); *F02D 41/025* (2013.01); *F02D 41/0255* (2013.01); *F02D 41/1401* (2013.01); *F02D 41/1446* (2013.01)

(58) Field of Classification Search
CPC .. F02D 41/126; F02D 41/0087; F02D 41/024; F02D 41/025; F02D 41/0255; F02D 41/1446
USPC ................................................. 123/325–326
See application file for complete search history.

(56) References Cited

U.S. PATENT DOCUMENTS

| | | | | |
|---|---|---|---|---|
| 5,845,492 A * | 12/1998 | Isobe | ........................ | F01N 3/32 60/284 |
| 6,240,723 B1 * | 6/2001 | Ito | ......................... | F02D 41/405 123/568.21 |
| 6,341,487 B1 * | 1/2002 | Takahashi | ............. | F01N 3/0842 123/430 |
| 6,513,319 B2 * | 2/2003 | Nozawa | ................ | F02D 41/024 60/284 |
| 6,829,887 B2 * | 12/2004 | Suzuki | .................. | F02D 41/062 60/284 |
| 6,895,744 B2 * | 5/2005 | Osawa | ................ | F02N 11/0818 60/277 |

(Continued)

FOREIGN PATENT DOCUMENTS

| | | | |
|---|---|---|---|
| JP | 11082143 A | * | 3/1999 |
| JP | 11082143 A | * | 3/1999 |

(Continued)

OTHER PUBLICATIONS

Glugla, C., "Methods and Systems for Increasing Catalyst Temperature," U.S. Appl. No. 17/443,931, filed Jul. 28, 2021, 60 pages.

*Primary Examiner* — Sizo B Vilakazi
*Assistant Examiner* — Brian R Kirby
(74) *Attorney, Agent, or Firm* — Vincent Mastrogiacomo; McCoy Russell LLP

(57) ABSTRACT

Methods and systems are provided for maintaining efficiency of a catalyst that is positioned in an exhaust system downstream of an internal combustion engine. In one example, the catalyst may be heated via supplying fuel to a cylinder that does not combust the fuel. The fuel may be oxidized at the catalyst via excess oxygen in the exhaust system.

19 Claims, 4 Drawing Sheets

(56) References Cited

U.S. PATENT DOCUMENTS

| | | | |
|---|---|---|---|
| 6,978,204 B2* | 12/2005 | Surnilla | F02P 5/045 60/276 |
| 7,055,312 B2* | 6/2006 | Osawa | F02D 41/2454 60/284 |
| 7,933,711 B1* | 4/2011 | Ulrey | F02D 41/065 123/406.47 |
| 8,267,067 B2* | 9/2012 | Reiche | F02P 5/1506 123/406.76 |
| 8,392,091 B2 | 3/2013 | Hebbale et al. | |
| 9,422,882 B2* | 8/2016 | Nakayama | F02D 19/0668 |
| 10,450,930 B2 | 10/2019 | Smith et al. | |
| 10,662,847 B2* | 5/2020 | Piper | F02D 41/1446 |
| 10,900,429 B2* | 1/2021 | Nose | F01N 3/035 |
| 11,187,178 B1* | 11/2021 | Bieniek | F02D 23/00 |
| 2002/0020169 A1* | 2/2002 | Ketcher | F01N 3/2853 60/285 |
| 2003/0074891 A1* | 4/2003 | Tamura | F01N 3/2006 60/284 |
| 2005/0097888 A1* | 5/2005 | Miyashita | F02D 41/025 60/276 |
| 2010/0006078 A1* | 1/2010 | Shoda | F02N 11/0829 60/299 |
| 2011/0023824 A1* | 2/2011 | Asai | F02D 17/02 123/445 |
| 2011/0239988 A1* | 10/2011 | Reiche | F02P 5/1506 123/406.76 |
| 2011/0283688 A1* | 11/2011 | Yuda | F02D 41/0087 60/300 |
| 2013/0158838 A1* | 6/2013 | Yorke | B60W 30/18018 701/123 |
| 2014/0041362 A1* | 2/2014 | Ulrey | F02D 37/02 60/287 |
| 2014/0041630 A1* | 2/2014 | Carlson | F02P 5/1506 123/406.12 |
| 2015/0136082 A1* | 5/2015 | Younkins | F02D 41/025 60/285 |
| 2016/0214602 A1* | 7/2016 | Takara | B60K 6/445 |
| 2017/0130630 A1* | 5/2017 | Younkins | F01N 13/009 |
| 2017/0130635 A1* | 5/2017 | Smith | B60K 6/24 |
| 2017/0306872 A1* | 10/2017 | Hokuto | F02D 41/123 |
| 2018/0209363 A1* | 7/2018 | Suzuki | F02D 41/1454 |
| 2020/0047741 A1* | 2/2020 | Nose | B60K 6/24 |
| 2020/0172088 A1* | 6/2020 | Dudar | B60W 60/001 |
| 2020/0232325 A1* | 7/2020 | Nakamura | F02B 75/045 |
| 2021/0062742 A1* | 3/2021 | Hotta | F01N 3/28 |
| 2022/0001851 A1* | 1/2022 | Namba | F02D 15/02 |

FOREIGN PATENT DOCUMENTS

| | | | | |
|---|---|---|---|---|
| WO | WO-2010086710 A1 | * | 8/2010 | ............ F01N 13/011 |
| WO | WO-2020095536 A1 | * | 5/2020 | ............ B60W 10/06 |
| WO | WO-2020208389 A1 | * | 10/2020 | |

* cited by examiner

METHOD AND SYSTEM FOR REACTIVATING A CATALYST

FIELD

The present application relates to methods and systems for reactivating a catalyst that has cooled.

BACKGROUND/SUMMARY

An internal combustion engine may include a catalyst in an exhaust system. The catalyst may convert HC, NOx, and CO to $H_2O$, $N_2$, and $CO_2$. The catalyst may have a higher efficiency when it operates above a first temperature (e.g., 200° C.) and below a second temperature (e.g., 650° C.). If the catalyst is cool due to a vehicle being parked and an engine being stopped, the catalyst may be brought up to operating temperature via heat from engine exhaust. However, the catalyst temperature may fall below a threshold temperature while the engine is operating due to the engine entering a fuel cut-off mode to conserve fuel. Additionally, the catalyst temperature may fall below the threshold temperature if the engine is automatically stopped by an engine controller to conserve fuel. It may be desirable to prevent the catalyst from falling below the threshold operating temperature so that catalyst efficiency remains high.

The inventor herein has recognized that catalyst cooling during fuel cut-out conditions may be detrimental to retaining high catalyst efficiency and has developed a method for operating an engine, comprising: operating the engine in a fuel cut-off mode; and supplying a fuel to a first cylinder without combusting the fuel in the cylinder in response to a temperature of a catalyst being less than a threshold temperature.

By delivering raw fuel with air to a catalyst after a temperature of the catalyst has been reduced below a threshold temperature, it may be possible to rapidly warm a catalyst so that the catalyst may continue to operate at a high efficiency level. In addition, it may be desirable to increase a temperature of a catalyst before an engine is expected to be automatically stopped for longer than a threshold amount of time. By increasing the catalyst temperature before the engine is automatically stopped, it may be possible to stop the engine and have the catalyst remain at a desirable operating temperature until the engine is automatically restarted. Consequently, engine emissions may be maintained at a lower level.

The present description may provide several advantages. In particular, the approach may reduce engine emissions. Further, the approach may increase an amount of time that an engine may be stopped so that vehicle fuel economy may be improved. In addition, the approach may be applied to gasoline and diesel engines.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
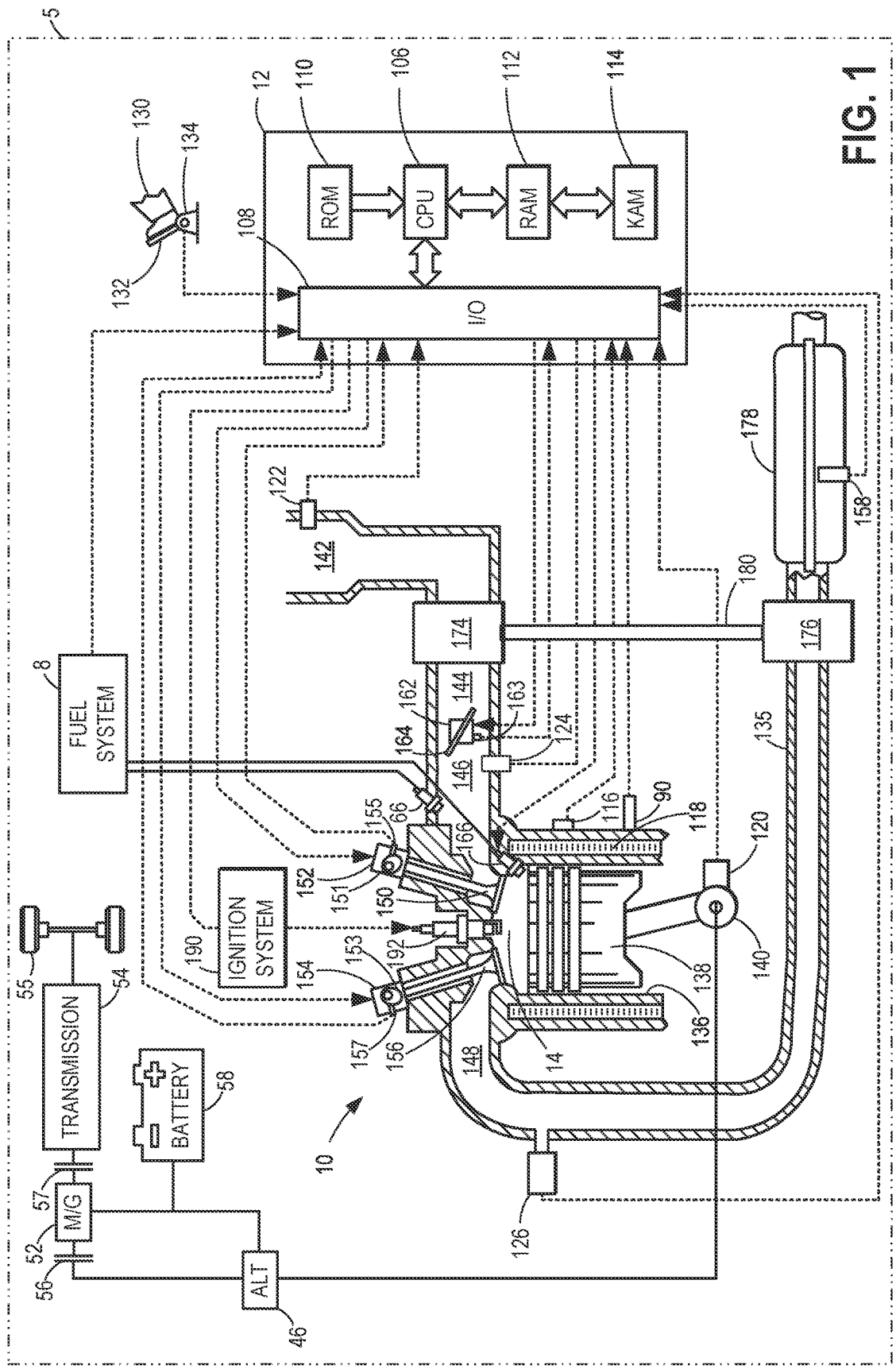
FIG. 1 shows a schematic depiction of an engine system of a vehicle.
Figure 2:
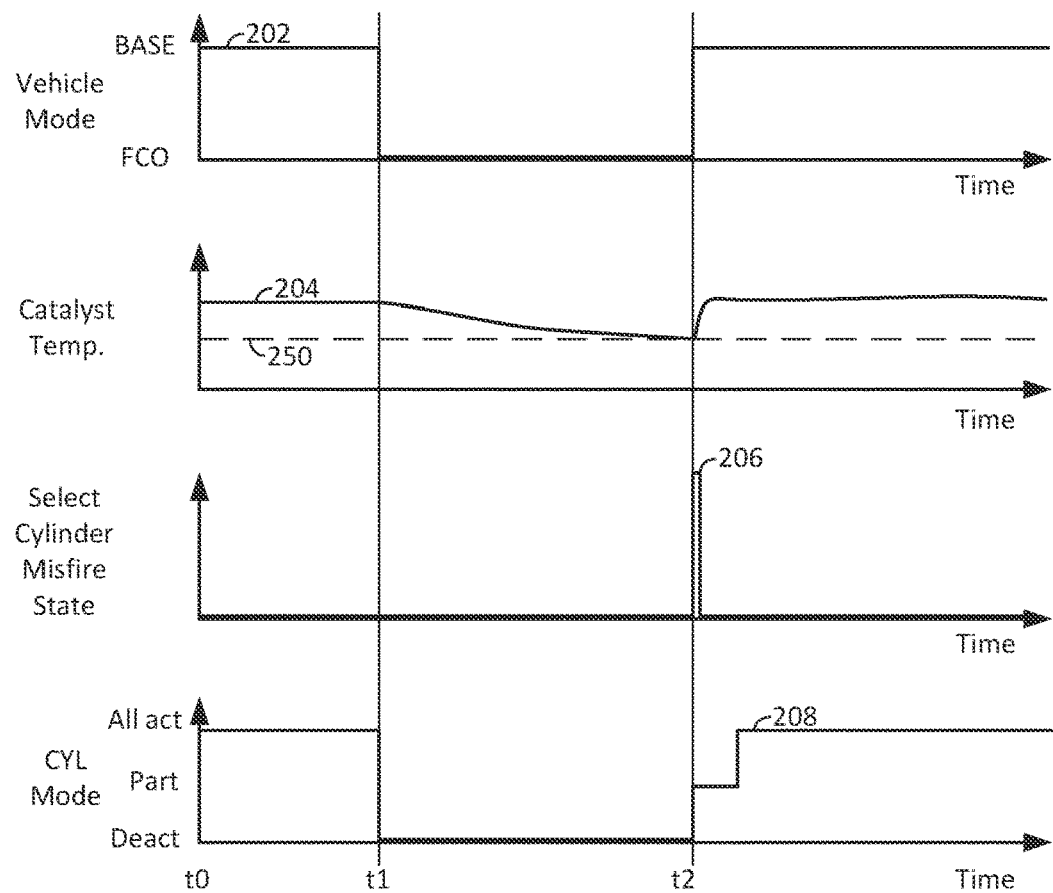
FIGS. 2 and 3 show example engine operating sequences according to the method of FIG. 4.
Figure 3:
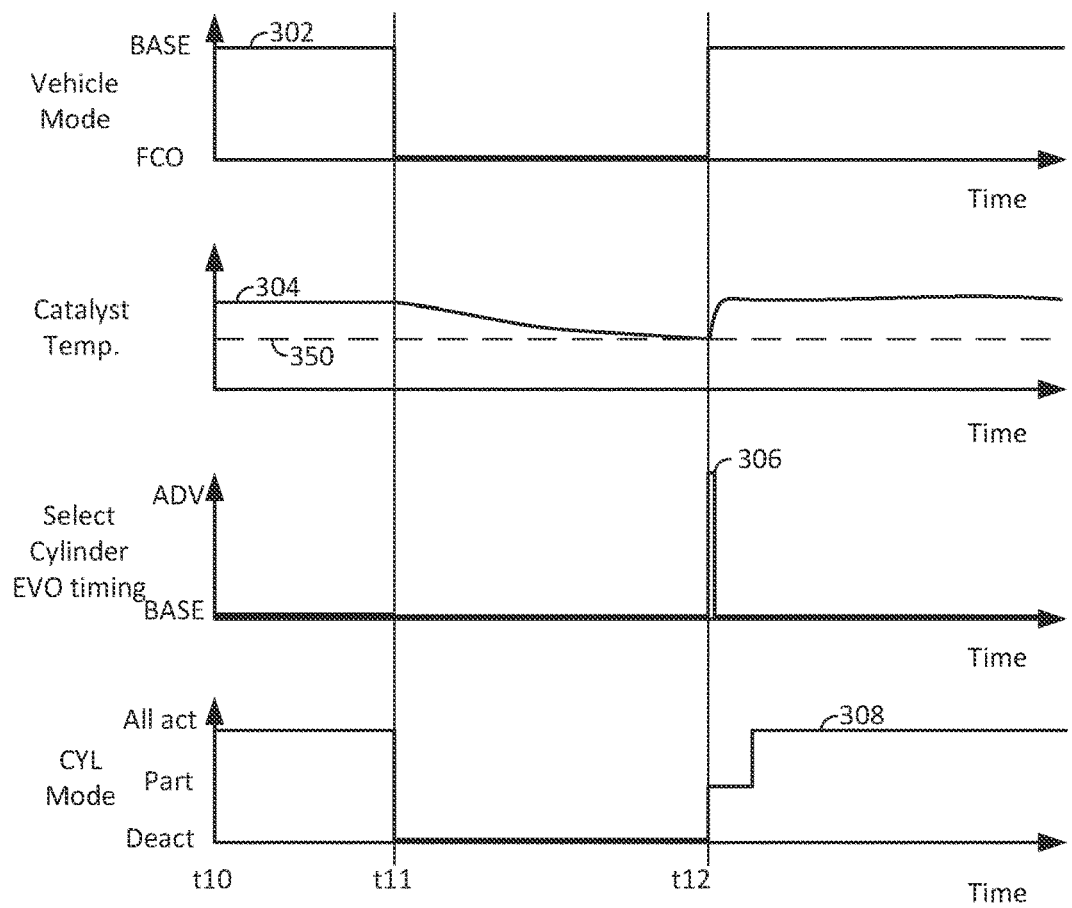

The following description relates to systems and methods for operating an engine that may be automatically stopped or enter a fuel cut-off mode (e.g., low load fuel cut-off). The engine may be a variable displacement engine (VDE). The engine may be of the type that is shown in FIG. 1. The engine may be operated according to the operating sequences that are shown in FIGS. 2 and 3. The sequences of FIGS. 2 and 3 may be generated via the system of FIG. 1 in cooperation with the method of FIG. 4.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via a driver demand pedal 132. In this example, driver demand pedal 132 includes a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 22:1, depending on whether engine 10 is configured as a gasoline or diesel engine. The compression ratio may also be increased if direct injection is used due to its effect on engine knock.

Each cylinder of engine 10 may include a spark plug 192 for initiating combustion when the engine is configured to combust gasoline or petrol. However, spark plug 192 may be omitted when engine 10 is configured to combust diesel fuel. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition or compression ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different diesel fuel, alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; a catalyst temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations via sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more entire engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Thus, the system of FIG. 1 provides for a system for operating an engine, comprising: an internal combustion engine including a catalyst; and a controller including executable instructions stored in non-transitory memory that cause the controller to advance exhaust valve opening timing in response to a temperature of the catalyst being less than a threshold temperature while the engine is operating in a fuel cut-off mode. The system further comprises additional instructions to inject a fuel to a cylinder to exit the fuel cut-off mode without combusting the fuel. The system includes where the fuel is injected directly into the cylinder during an exhaust stroke of the cylinder. The system further comprises additional instructions to activate one or more engine cylinders in response to the temperature of the catalyst being less than the threshold temperature. The system further comprises additional instructions to select activation frequencies and patterns for which engine cylinders included in the one or more engine cylinders are operated responsive to engine noise, vibration, and harshness. The system includes where the temperature of the catalyst is estimated based on traffic data, data from other vehicles, road grade, and travel route. The system includes where the temperature of the catalyst is measured. The system includes where the internal combustion engine is a diesel engine.

Figure 4:
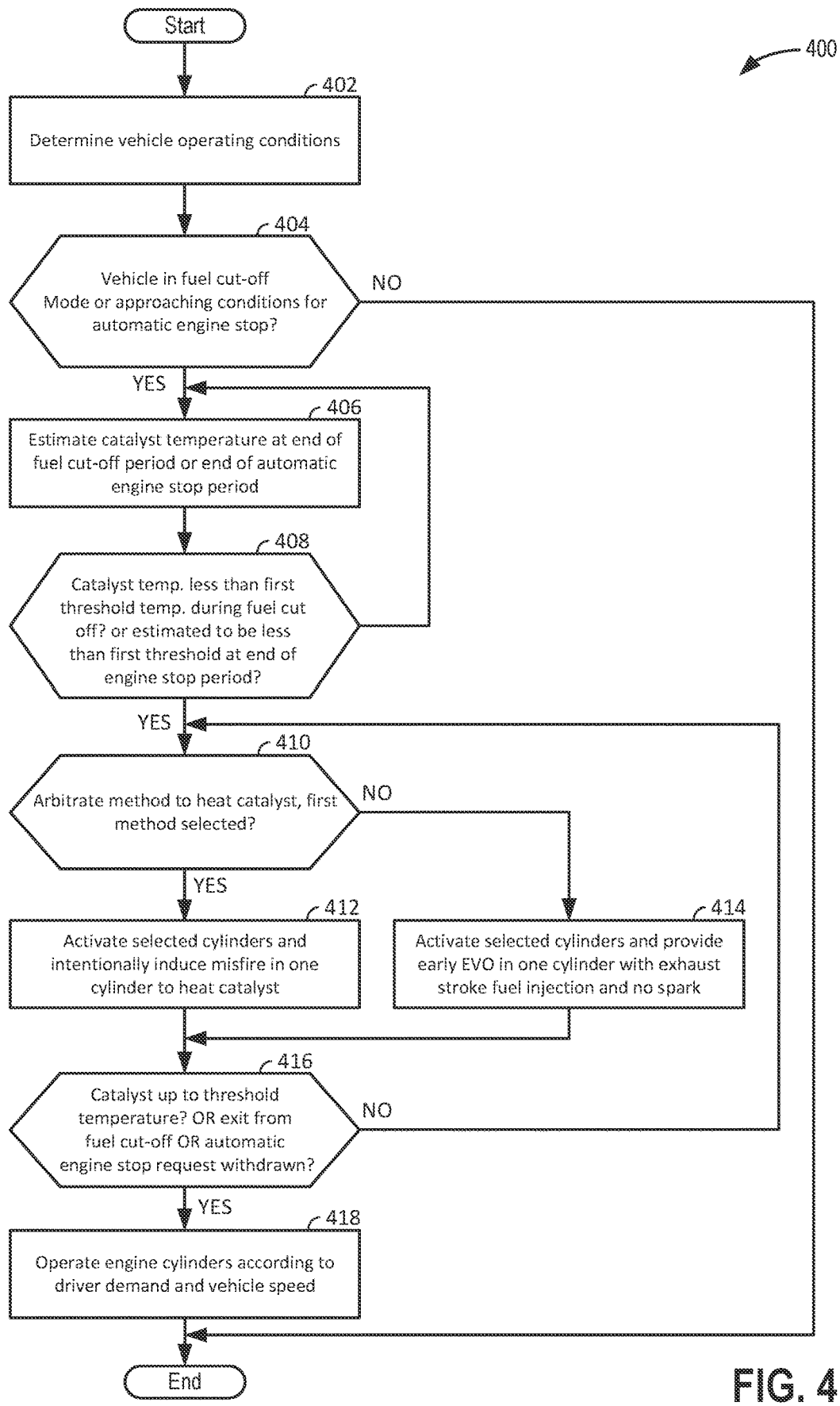
FIG. 4 shows a flow chart of a method for operating an engine.

Referring now to FIG. 2, an example engine operating sequence according to the method of FIG. 4 is shown. In particular, one cylinder of an engine is misfired to increase a temperature of a catalyst that has been cooled due to an engine entering a fuel cut-off mode. The sequence of FIG. 2 may be provided via the system of FIG. 1 in cooperation with the method of FIG. 4.

The first plot from the top of FIG. 2 is a plot of a vehicle operating mode versus time. The vertical axis represents vehicle operating mode and the vehicle operating mode is fuel cut-off (FCO) when trace 202 is at a lower level near the horizontal axis. The vehicle operating mode is base or cylinders combusting air and fuel when trace 202 is near the vertical axis arrow. The horizontal axis represents time and time increases from the left side of the figure to the right side of the figure. Trace 202 represents the vehicle operating mode.

The second plot from the top of FIG. 2 is a plot of catalyst temperature versus time. The vertical axis represents catalyst temperature and the catalyst temperature increases in the direction of the vertical axis arrow. The horizontal axis represents time and time increases from the left side of the figure to the right side of the figure. Trace 204 represents the catalyst temperature. Horizontal line 250 represents a threshold catalyst temperature above which the catalyst operates at a desired high level efficiency.

The third plot from the top of FIG. 2 is a plot of a cylinder misfire state (e.g., injecting fuel to the cylinder without combusting the fuel) versus time. The vertical axis represents cylinder misfire state and the cylinder is misfiring when trace 206 is at a higher level near the vertical axis arrow. The cylinder is not misfiring when trace 206 is at a lower level that is near the horizontal axis. The horizontal axis represents time and time increases from the left side of the figure to the right side of the figure. Trace 206 represents the cylinder misfire state.

The fourth plot from the top of FIG. 2 is a plot of a cylinder operating mode versus time. The vertical axis represents cylinder operating mode and the cylinder operating mode is cylinders are deactivated (Deact) when trace 208 is at a lower level near the horizontal axis. The cylinder operating mode is all cylinders active (All act) when trace 208 is near the vertical axis arrow. The cylinder operating mode is a partial number of cylinders are active when trace 208 is at a middle level (Part). Trace 208 represents the cylinder operating mode.

At time t0, the vehicle is operating with all cylinders active and the catalyst temperature is above threshold 250. The selected cylinder is not misfiring. Such conditions may be present when a vehicle is cruising at highway speeds.

At time t1, the driver demand torque (not show) is reduced causing the vehicle mode to change from all cylinders activated to fuel cut-off mode where the engine continues to rotate while fuel is not injected to engine cylinders. The select cylinder does not misfire, but the catalyst temperature begins to decline as combustion ceases in the engine and as the engine begins to pump air to the catalyst. The cylinder mode changes from all cylinders active to all cylinders deactivated.

At time t2, the catalyst temperature is reduced to less than threshold temperature 250. Therefore, at least one cylinder is activated to generate heat, and the at least one cylinder may be operate with a lean air-fuel ratio so that oxygen may be provided to the catalyst. In addition, a misfire is generated in another cylinder. The misfire may be generated when no spark is provided to an air-fuel mixture for gasoline engines and when fuel is injected in an exhaust stroke of a diesel engine. The misfire may cause the cylinder to eject fuel so that raw fuel migrates to the catalyst where it may be combusted with the excess air that passes through the activated cylinder. The combusted fuel generates an exotherm in the catalyst, thereby causing the catalyst temperature and efficiency to increase.

Shortly after time t2, the cylinder mode changes from partially active to all cylinders being active. In addition, misfiring in the selected cylinder is terminated so that the exotherm may be limited.

In this way, an exotherm may be generated in a catalyst in response to a catalyst temperature so that catalyst efficiency may be maintained. The engine may also enter a variable displacement mode so that cylinders that are activated may operate at a higher efficiency level.

Referring now to FIG. 3, an example engine operating sequence according to the method of FIG. 4 is shown. In particular, one cylinder of an engine has timing of its exhaust valve opening adjusted to increase a temperature of a catalyst that has been cooled due to an engine entering a fuel cut-off mode. The sequence of FIG. 3 may be provided via the system of FIG. 1 in cooperation with the method of FIG. 4.

The first plot from the top of FIG. 3 is a plot of a vehicle operating mode versus time. The vertical axis represents vehicle operating mode and the vehicle operating mode is fuel cut-off (FCO) when trace 302 is at a lower level near the horizontal axis. The horizontal axis represents time and time increases from the left side of the figure to the right side of the figure. The vehicle operating mode is base or cylinders combusting air and fuel when trace 302 is near the vertical axis arrow. Trace 302 represents the vehicle operating mode.

The second plot from the top of FIG. 3 is a plot of catalyst temperature versus time. The vertical axis represents catalyst temperature and the catalyst temperature increases in the direction of the vertical axis arrow. The horizontal axis represents time and time increases from the left side of the figure to the right side of the figure. Trace 304 represents the catalyst temperature. Horizontal line 350 represents a threshold catalyst temperature above which the catalyst operates at a desired high level efficiency.

The third plot from the top of FIG. 3 is a plot of a cylinder exhaust valve opening timing versus time. The vertical axis represents exhaust valve opening timing and the exhaust valve opening timing advanced when trace 306 is at a higher level near the vertical axis arrow. The cylinder exhaust valve opening timing is retarded when trace 306 is at a lower level that is near the horizontal axis. The horizontal axis represents time and time increases from the left side of the figure to the right side of the figure. Trace 306 represents the cylinder exhaust valve opening timing.

The fourth plot from the top of FIG. 3 is a plot of a cylinder operating mode versus time. The vertical axis represents cylinder operating mode and the cylinder operating mode is cylinders are deactivated (Deact) when trace 308 is at a lower level near the horizontal axis. The cylinder operating mode is all cylinders active (All act) when trace 308 is near the vertical axis arrow. The cylinder operating mode is a partial number of cylinders are active when trace 308 is at a middle level (Part). Trace 308 represents the cylinder operating mode.

At time t10, the vehicle is operating with all cylinders active and the catalyst temperature is above threshold 350. The selected cylinder is not misfiring. Such conditions may be present when a vehicle is cruising at highway speeds.

At time t11, the driver demand torque (not show) is reduced causing the vehicle mode to change from all cylinders activated to fuel cut-off mode where the engine continues to rotate while fuel is not injected to engine cylinders. The select cylinder does not misfire, but the catalyst temperature begins to decline as combustion ceases in the engine and as the engine begins to pump air to the catalyst. The cylinder mode changes from all cylinders active to all cylinders deactivated.

At time t12, the catalyst temperature is reduced to less than threshold temperature 350. Therefore, at exhaust valve timing of at least one cylinder is advanced such that the exhaust valves open near top-dead-center exhaust stroke. Fuel is injected into the same cylinder and the fuel is not combusted in the cylinder. Rather, it is delivered to the exhaust system in a heated state due to being ejected from the cylinder near top-dead-center exhaust stroke. Additionally, one or more cylinders may be reactivated to generate heat and the at least one cylinder of the reactivated cylinders may be operate with a lean air-fuel ratio so that oxygen may be provided to the catalyst. In this way, raw fuel is delivered to the warm catalyst along with air and the air-fuel mixture is combusted in the catalyst to generate an exotherm in the catalyst, thereby causing the catalyst temperature and efficiency to increase. Shortly after time t12, all cylinders are activated to meet driver demand torque and heat the catalyst.

In this way, an exotherm may be generated in a catalyst in response to a catalyst temperature so that catalyst efficiency may be maintained. Adjusting the exhaust valve timing may operate to ease combustion within the catalyst. The engine may also enter a variable displacement mode so that cylinders that are activated may operate at a higher efficiency level.

Referring now to FIG. 4, the method of FIG. 4 may be included in and may cooperate with the system of FIG. 1. At least portions of method 400 may be incorporated in the system of FIG. 1 as executable instructions stored in non-transitory memory. In addition, other portions of method 400 may be performed via a controller transforming operating states of devices and actuators in the physical world. The controller may employ engine actuators of the engine system to adjust engine operation. Further, method 400 may determine selected control parameters from sensor inputs.

At 402, method 400 determines vehicle operating conditions. Vehicle operating conditions may include but are not limited to catalyst temperature, driver demand torque, engine temperature, ambient temperature, operating states of traffic control lights, traffic flow data, travel route, a grade of a road that the vehicle is traveling on, vehicle speed, and vehicle drive history. Method 400 may determine the operating conditions via on board vehicle sensors, vehicle to vehicle communications, and vehicle to cloud communications. Method 400 proceeds to 404.

At 404, method 400 judges if the vehicle is presently in a fuel cut-off mode or if the vehicle is approaching conditions where the engine may be automatically stopped. Method 400 may judge that the vehicle is in a fuel cut-off mode based on vehicle speed, driver demand torque, and status of fuel injection to the vehicle's engine. Method 400 may judge if the vehicle is approaching a geographic location where the engine may be stopped based on traffic signal information, travel route data, and driver demand. If method 400 judges that the vehicle is in a fuel cut-off mode or that the vehicle is approaching a position where the vehicle's engine may automatically stop, the answer is yes and method 400 proceeds to 406. Otherwise, the answer is no and method 400 proceeds to exit.

At 406, method 400 estimates a temperature of a catalyst that is in the engine's exhaust system. The catalyst temperature may be estimated to determine a time when the engine exits automatic stop after the engine was automatically stopped (e.g., a controller ceases injecting fuel to the engine and engine rotation is ceased in response to vehicle operating conditions, excluding requests from a vehicle operator to stop the engine). The catalyst temperature during an automatic engine stop may be estimated via the following equation:

$$Tcatauto = f(t, Tcatstart, CC, Vs, If, Tamb)$$

where Tcatauto is the temperature of the catalyst while the engine is automatically stopped, where f is a function that returns the catalyst temperature, where t is an amount of time since the most recent time the engine was automatically stopped, where Tcatstart is a temperature of the catalyst at the time the engine was most recently automatically stopped, where CC is thermal capacitance of the catalyst, where Vs is vehicle speed, where If is an insulation factor for the catalyst, and where Tamb is ambient air temperature.

The catalyst temperature may also be sensed via a temperature sensor during fuel cut-off mode, or a future catalyst temperature may be estimated when the vehicle enters a fuel cut-off mode so that an expected time that the catalyst temperature falls below a threshold temperature may be estimated. In one example, the catalyst temperature during a fuel cut-out mode may be estimated via the following equation:

$$Tcatcutoff = g(t, Tcatstart, Tamb, CC, Vs, If, engflow)$$

where Tcatcutoff is the temperature of the catalyst while the engine is in a fuel cut-off mode, where g is a function that returns the catalyst temperature, t is an amount of time since the most recent time the engine entered fuel cut-off mode, where Tcatstart is a temperature of the catalyst at the time the engine most recently entered fuel cut-off mode, where Tamb is ambient air temperature, where CC is thermal capacitance of the catalyst, where Vs is vehicle speed, where If is an insulation factor for the catalyst, and where engflow is air flow through the engine. Method 400 proceeds to 408.

At 408, method 400 judges if the present catalyst temperature is less than a threshold temperature when the engine is operated in a fuel cut-off mode. Alternatively, method 400 judges if the catalyst temperature is estimated to be less than a threshold temperature at an end of an automatic engine stop (e.g., at a time when the engine that was automatically stopped is automatically started according to vehicle operating conditions such as release of a brake pedal). If so, the answer is yes and method 400 proceeds to 410. Otherwise, method 400 may return to 406 to continue estimating catalyst temperature, or alternatively, method 400 may exit if the engine exits fuel cut-off mode or automatic stop mode prematurely.

Method 400 may heat the catalyst by retarding spark timing in active cylinders, adjusting exhaust valve timing in cylinders that are not combusting air and fuel, and generating misfires in one or more engine cylinders if the engine is combusting air and fuel prior to a time that the engine is expected to be automatically stopped so that the catalyst has a higher initial temperature when the engine is stopped so that the catalyst may remain above a threshold temperature for a longer period of time after the engine is automatically stopped. Such action may increase an amount of time that the engine may be stopped after being automatically stopped. The engine may be operated according to step 412 or step 414 during such conditions depending on arbitration.

At 410, method 400 may arbitrate which of a plurality of methods may be invoked to heat the catalyst to a desired temperature. The arbitrator may choose to heat the catalyst via a first method if select conditions are met. If the select conditions are not met, method 400 may heat the catalyst via a second method, or still another method. In one example, method 400 may select the first method if the engine does not include variable exhaust valve timing. Further, the first or the second method may be selected based on traffic flow, traffic signals, and road grade. Method 400 proceeds to 412 if the first method is selected. Method 400 proceeds to 414 if the second method is selected.

At 412, method 400 activates one or more selected cylinders and intentionally induces a misfire in a cylinder that is not activated. Method 400 may activate fewer than the engine's full complement of cylinders, and the cylinders that are selected to be activated may be selected to provide a predetermined pattern and firing frequency of activated cylinders. One or more of the activated cylinders may be operated at a lean air fuel ratio (e.g., 15.5:1 for a gasoline engine) so that excess oxygen may be provided to the catalyst to aid combustion within the catalyst. Additionally, the activated cylinders may be operated with ignition timing that is retarded from base timing for the present driver demand and engine speed so that the engine may generate less torque and provide additional heat to the catalyst. The cylinder that is selected to misfire may be supplied with fuel, but not spark if the engine is a gasoline engine. The cylinder may be supplied with fuel during an exhaust stroke of the cylinder so that the cylinder does not fire if the engine is a diesel engine. The cylinders that are selected to be activated may be based on the present driver demand, engine speed, and engine noise and vibration requirements. For example, if the engine is a four cylinder engine with a firing order of 1-3-4-2, cylinders one and four may be reactivated while cylinder number two is supplied with fuel, but not spark. Method 400 proceeds to 416.

At 414, method 400 activates one or more selected cylinders and advances exhaust valve opening time of a cylinder that receives fuel but not spark. The exhaust opening valve timing may be advanced so that exhaust valve opening timing is within forty five crankshaft degrees of top-dead-center exhaust stroke of the cylinder having advanced exhaust valve timing. By advancing exhaust valve timing, a warmer mixture of air and fuel may be supplied to the catalyst that is to be heated so that combustion in the catalyst may be improved. One or more of the activated cylinders may be operated at a lean air fuel ratio (e.g., 15.5:1 for a gasoline engine) so that excess oxygen may be provided to the catalyst to aid combustion within the catalyst. Additionally, the activated cylinders may be operated with ignition timing that is retarded from base timing for the present driver demand and engine speed so that the engine may generate less torque and provide additional heat to the catalyst. Method 400 may activate fewer than the engine's full complement of cylinders, and the cylinders that are selected to be activated may be selected to provide a predetermined pattern and firing frequency of activated cylinders. The cylinder that is selected to have advanced exhaust valve opening timing may be supplied with fuel, but not spark if the engine is a gasoline engine. The cylinder may be supplied with fuel during an exhaust stroke of the cylinder so that the cylinder does not fire if the engine is a diesel engine. The cylinders that are selected to be activated may be based on the present driver demand, engine speed, and engine noise and vibration requirements. For example, if the engine is a four cylinder engine with a firing order of 1-3-4-2, cylinders one and four may be reactivated while cylinder number two operates with advanced exhaust opening timing. Method 400 proceeds to 416.

At 416, method 400 judges if the catalyst has been warmed to a second threshold temperature. In addition, method 400 may judge if vehicle operating conditions are such that it may be desirable to exit fuel cut-off mode or exit automatic engine stop. If the catalyst temperature is greater than the second threshold temperature or if conditions are present to exit fuel cut-off mode or automatic engine stop, the answer is yes and method 400 proceeds to 418. Otherwise, the answer is no and method 400 returns to 410.

At 418, method 400 may reactivate all engine cylinders and the engine may be controlled to provide a driver demand torque. In one example, method 400 may reactivate the engine's total complement of cylinders and adjust intake and exhaust valve timing to base timing for the present engine speed and driver demand torque. Method 400 proceeds to exit.

In this way, method 400 increase a temperature of a catalyst prior to an automatic engine stop so that a catalyst may remain above a threshold temperature for a longer amount of time. Further, method 400 may reactivate the catalyst by supplying heat to the catalyst via a purposefully misfiring cylinder having advanced exhaust valve opening timing.

Thus, the method of FIG. 4 provides for a method for operating an engine, comprising: operating the engine in a fuel cut-off mode; and supplying a fuel to a first cylinder without combusting the fuel in the cylinder in response to a temperature of a catalyst being less than a threshold temperature. The method includes where the engine rotates without receiving the fuel to one or more cylinders in the fuel cut-off mode. The method further comprises reactivating one or more cylinders in response to the catalyst temperature being less than the threshold temperature. The method includes where reactivating one or more cylinders includes selecting a cylinder firing pattern responsive to engine noise, vibration, and harshness. The method includes where operating the engine in the fuel cut-off mode includes operating intake and exhaust valves of each engine cylinder during a cycle of the engine. The method includes where the engine is a diesel engine. The method includes where the engine is a gasoline engine.

The method of FIG. 4 also provides for a method for operating an engine, comprising: operating an engine; and increasing a temperature of a catalyst in response to an estimated temperature of the catalyst, the estimated temperature based on a time of an end of an automatic engine stop period. The method includes where the temperature of the catalyst is increased while the engine is activated. The method includes where the temperature is increased via injecting fuel to a cylinder and not combusting the fuel in the cylinder during a cycle of the engine. The method further comprises advancing exhaust valve opening timing to increase the temperature. The method includes where the end of the engine stop period (e.g., where the engine is automatically restarted via a controller) is an end of an automatic engine stop period.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine of a vehicle, comprising:
operating the engine; and
while the engine is running and the vehicle is approaching conditions for an automatic engine stop period, supplying a fuel to a first cylinder without combusting the fuel in the first cylinder in response to a temperature estimate of a catalyst being less than a threshold temperature at an end of the automatic engine stop period, the temperature estimate of the catalyst based on a time of the end of the automatic engine stop period.

2. The method of claim 1, where the temperature estimate of the catalyst is further based on ambient air temperature.

3. The method of claim 2, where the conditions for the automatic engine stop period include a traffic signal.

4. The method of claim 1, where operating the engine includes selecting a cylinder firing pattern responsive to engine noise, vibration, and harshness.

5. The method of claim 1, further comprising operating a second engine cylinder with a lean air-fuel ratio and combusting the lean air-fuel ratio.

6. The method of claim 1, where the engine is a diesel engine.

7. The method of claim 1, where the engine is a gasoline engine.

8. A system for operating an engine, comprising:
an internal combustion engine including a catalyst; and
a controller including executable instructions stored in non-transitory memory that cause the controller to advance exhaust valve opening timing in response to a temperature of the catalyst being less than a threshold temperature while the engine is operating in a fuel cut-off mode.

9. The system of claim 8, further comprising additional instructions to inject a fuel to a cylinder to exit the fuel cut-off mode without combusting the fuel.

10. The system of claim 9, where the fuel is injected directly into the cylinder during an exhaust stroke of the cylinder.

11. The system of claim 10, further comprising additional instructions to activate one or more engine cylinders in response to the temperature of the catalyst being less than the threshold temperature.

12. The system of claim 11, further comprising additional instructions to select activation frequencies and patterns for which engine cylinders included in the one or more engine cylinders are operated responsive to engine noise, vibration, and harshness.

13. The system of claim 8, where the temperature of the catalyst is estimated based on traffic data, data from other vehicles, road grade, and travel route.

14. The system of claim 8, where the temperature of the catalyst is measured.

15. The system of claim 8, where the internal combustion engine is a diesel engine.

16. A method for operating an engine of a vehicle, comprising:
   operating an engine; and
   while the engine is running and the vehicle is approaching conditions for an automatic engine stop period, increasing a temperature of a catalyst in response to an estimated temperature of the catalyst, the estimated temperature of the catalyst based on a time of an end of the automatic engine stop period.

17. The method of claim 16, where the temperature of the catalyst is increased in response to the vehicle approaching conditions for the automatic engine stop period via intentionally inducing misfire in one cylinder of the engine.

18. The method of claim 16, where the temperature of the catalyst is increased via injecting fuel to a cylinder and not combusting the fuel in the cylinder during a cycle of the engine while the engine is running and the vehicle is approaching conditions for the automatic engine stop period in response to the estimated temperature of the catalyst at the end of the automatic engine stop period.

19. The method of claim 18, further comprising advancing exhaust valve opening timing to increase the temperature of the catalyst while the engine is running and the vehicle is approaching conditions for the automatic engine stop period in response to an estimated temperature of the catalyst at the end of the automatic engine stop period.

\* \* \* \* \*